United States Patent

[11] 3,616,909

| [72] | Inventors | Erlend R. Lowrey<br>Greenhills;<br>Robert O. Schmitt, Wyoming, both of Ohio |
|------|-----------|--------|
| [21] | Appl. No. | 876,644 |
| [22] | Filed | Nov. 14, 1969 |
| [45] | Patented | Nov. 2, 1971 |
| [73] | Assignee | The Procter & Gamble Company<br>Cincinnati, Ohio |

[54] CONTINUOUS HIGH TEMPERATURE PROCESS FOR RECLAIMING REUSABLE FRYING FATS
15 Claims, 3 Drawing Figs.

| [52] | U.S. Cl. | 210/73, 210/84, 210/167 |
|------|----------|--------|
| [51] | Int. Cl. | B01d 21/26 |
| [50] | Field of Search | 210/73, 84, 167, 512 M, 512 |

[56] References Cited
UNITED STATES PATENTS

| 2,754,968 | 7/1956 | Vegter et al. | 210/512 M |
|-----------|--------|---------------|-----------|
| 2,895,883 | 7/1959 | Hobson | 210/512 X |
| 3,259,246 | 7/1966 | Stauengeg | 210/512 X |
| 3,356,218 | 12/1967 | Gruboski | 210/167 |
| 3,368,682 | 2/1968 | Boots | 210/167 X |

Primary Examiner—Reuben Friedman
Attorney—Edmund J. Sease

ABSTRACT: A continuous process for reclaiming reusable frying fat, which prior to reclamation, is contaminated with solid particles of food material, said process comprising, tangentially introducing a flow of contaminated frying fat into a cylindroconical shaped separating zone wherein said fat is subjected to vortical forces and separated into an outer-contaminated portion and an inner contamination-free portion which is reclaimed and reused.

PATENTED NOV 2 1971  3,616,909
Fig. 1
Fig. 2
Fig. 3
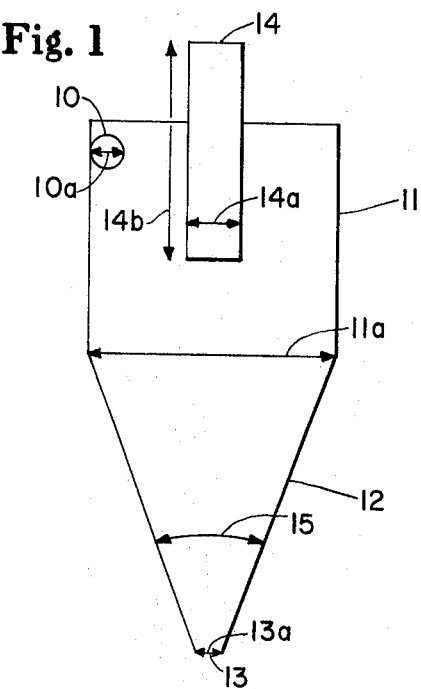
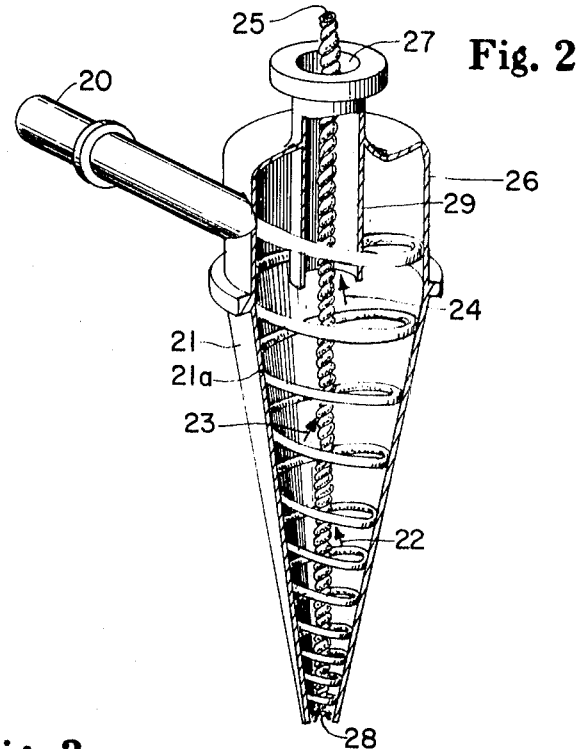
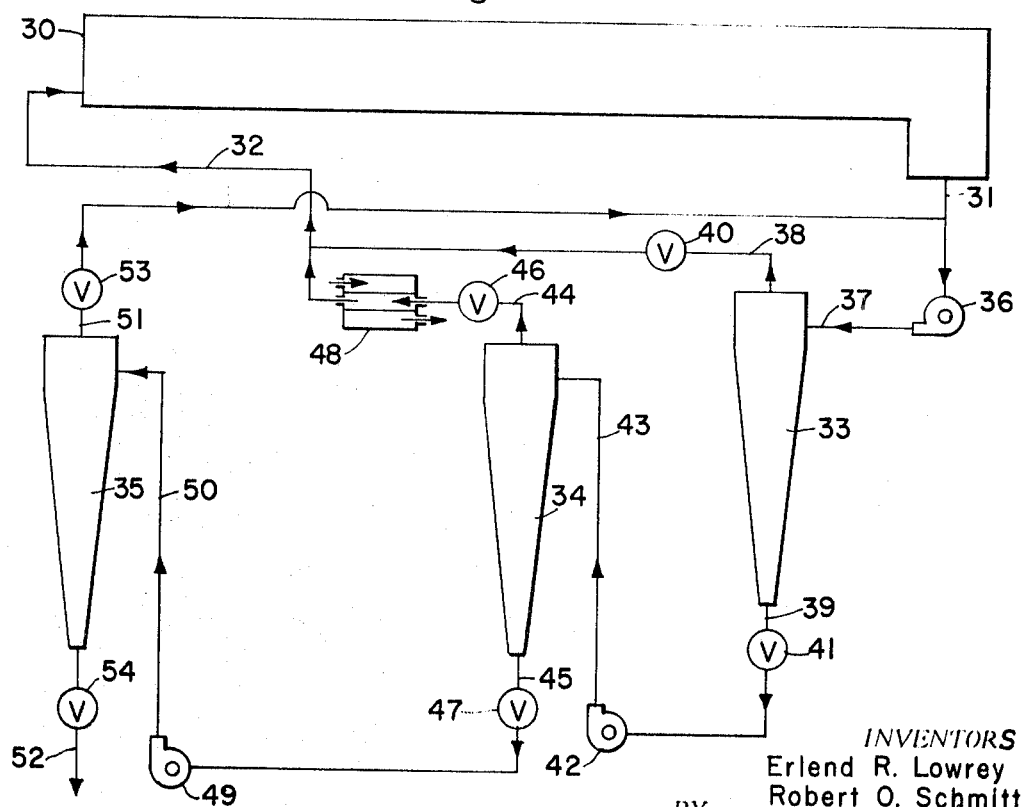
INVENTORS
Erlend R. Lowrey
Robert O. Schmitt
BY
Edmund J. Sease
ATTORNEY

CONTINUOUS HIGH TEMPERATURE PROCESS FOR RECLAIMING REUSABLE FRYING FATS

BACKGROUND OF THE INVENTION

This invention relates to the reclamation of reusable frying fat from frying fat contaminated with solid particles of food materials. Many prepared foods preferred by consumers are cooked by frying such foods by immersion in a high-temperature fat; for example, French fries, shrimp, potato chips and chicken are often commercially prepared for consumer consumption by deep fat frying processes. In the deep fat frying process the frying fat is maintained at a high temperature, usually within the range of from 275° to 425° F. and most commonly within the range of 325° F. to 375° F. Temperatures within the above-described ranges have been found desirable in that they provide a deep fat fried product within a reasonably short period of time and yet the temperatures are not so high that the smoke point of the fat or oil has been attained.

During the deep fat frying process small particles of the food material being fried often fall off or break off from the major portion of the food material and are left behind in the frying fat when the major portion of the food material is removed. During the continuous use of a frying fat there is a gradual buildup of these small food particles in the frying vessel. Because the frying fat is at the above indicated high frying temperatures these particles are continuously fried and gradually become burnt. These burnt food particles are very dark colored, have an outer crust, and often discolor the frying fat. Additionally, as new food materials to be fried are introduced into the frying fat, small contaminating burnt food particles often cling to the newly introduced food and give to the resulting fried product an undesirable speckled appearance. Moreover, high percentages of burnt food particles present in a frying fat contribute off-flavors to the frying fat which are often imparted to the resulting fried food. Finally, a high percentage of solid food particles present in the frying fat can interfere with the operation of the fryer itself. For example, if the fryer utilizes a continuously circulating frying fat zone an unusually large buildup of food particles in the frying fat or oil can clog inlet and exit lines and prevent recirculation.

Several methods have been developed to remove food particles from high temperature frying fats. Conventionally, a filtering apparatus has been used. However, several deficiencies exist in processes utilizing conventional filtering systems. Because of the high temperature of the frying fat, ordinary filter media such as conventional filter paper cannot be utilized for the high temperature frying fat would immediately destroy the filter paper. To solve the above-referred to problem in regard to utilization of conventional filtering apparatuses it has been necessary to use a filter media not effected by the high temperature of the frying fat. For instance in some cases Teflon has been utilized. However, even utilizing inert, high-temperature withstanding, filter media does not solve an additional problem; often the filter media gradually becomes plugged with food particles necessitating a shutdown and cleaning of the filtering system. Thus, utilization of conventional filter media even with inert filters is disadvantageous because frequent shutdowns and cleanings are necessitated and therefore the system cannot be run continuously. Another disadvantage in using conventional filter systems for high-temperature fat reclamation is that such systems are usually exposed to air which causes rapid oxidation resulting in rancidity. While enclosed filter systems can be used they are very expensive and frequently become plugged due to the gradual buildup of solid particles of food material. An additional deficiency of filtering systems is the inability of the system to handle surges of the contaminating food particles which occasionally occur. For example, when employing a conventional filter system a sudden surge usually results in plugging of the filter system and necessitates a shutdown and cleaning.

Another separation procedure conventionally used to remove solid particles of food materials from high-temperature frying fats is centrifugation. However, the utilization of simple centrifugal separation is also disadvantageous in that the high temperatures employed with frying fats, after a reasonable period of time, often destroy the seals presently utilized in most centrifuges. Therefore, without special seals centrifugal separation cannot be accomplished in a truly continuous fashion unless the frying fat temperature is reduced prior to the separation and reclamation process. Thus, if centrifugal separation is utilized the separated and reclaimed frying fat often must be cooled prior to separation and increased to frying temperatures prior to recirculation into the frying vessel.

Hence, there is a real need for a continuous high temperature process for reclaiming reusable frying fats from frying fats contaminated with small particles of food material without exposing the frying fats to the danger of oxidation. It is an object of this invention to satisfy this need.

SUMMARY OF THE INVENTION

In view of the above stated need, the present invention provides a continuous*

---
*As used herein, "continuous" is defined as referring to uninterrupted flow during operation and thus encompasses constant operation during the entire frying procedure as well as intermittent operation, for example, at the start of frying, provided there is an uninterrupted flow during said operation process for reclaiming reusable frying fat from frying fat contaminated with solid particles of food material, said process comprising, tangentially introducing a flow of food particle-containing frying fat at a pressure of 10 p.s.i. to 100 p.s.i. and preferably at frying temperatures of from 275° F. to 425° F. into the upper cylindrical portion of a cylindroconical shaped separating zone so that said particle-containing frying fat forms a vortex providing a centrifugal force within said particle-containing fat whereby more dense solid particles of food materials are hurled to the outer portion of said vortex wherein they are subjected to gravitational force and spiral downwardly to the lower conical-shaped portion of said zone and are withdrawn through an underflow exit and whereby less dense frying fat substantially free from food particles moves to the inner portion of the vortex and is spiraled upwardly along the liquid free central axis of the vortex and is withdrawn from said zone through an overflow exit and reclaimed for reuse, said process being conducted in the substantial absence of air.

The advantages of the basic process of this invention as outlined above are many. High temperature frying fats contaminated with food particles can be separated from the food particles without risk of air oxidation which normally would occur at frying temperatures of from 275° F. to 425° F.

The separated high temperature frying fat free from contamination with food particles can be reclaimed and recycled into a vessel containing frying fat ready for use. The residual frying fat heavily contaminated with food particles can be subjected in a continuous fashion to further separation in accord with the basic process as outlined above to reclaim further amounts of reusable frying fat.

The entire reclamation procedure can be accomplished in a relatively short period of time and can be operated continuously without the need alternate filter systems as utilized in the prior art.

Yet, another advantage is that because the process is continuous and run in the absence of oxygen, frying fat at a high temperature can be subjected to the process of this invention without fear of oxidation and resulting rancidity.

Still a further advantage is that the separation procedure of this invention does not utilize any apparatus having seals which could be destroyed by a high temperature frying fat.

BRIEF DESCRIPTION OF THE DRAWING

FIG. 1 is a schematic representation of a cylindroconical separating zone.

FIG. 2 is a representation of a hydraulic cyclone with parts broken away to show the liquid flow therethrough. Such an apparatus is a preferred one for practicing the process of the invention.

FIG. 3 is a schematic representation of a preferred embodiment of the process of this invention utilizing a plurality of cylindroconical shaped separating zones in series communication to provide a continuous process for reclamation and recirculation of reusable frying fat from frying fat contaminated with solid particles of food materials.

DETAILED DESCRIPTION OF THE INVENTION

The following definitions are given at the outset for purposes of clarity and are hereinafter used to describe the process of this invention:

Frying fat—As used herein the phrase "frying fat" includes solid and plastic frying fats as well as liquid frying oils. The phrase is intended to be generic to all fats and oils used for high temperature deep fat frying of foods.

Food particles—The phrase "food particles" and also the phrase "food materials," the two being used interchangeably, are intended to include all small parcels of food materials capable of being deep fat fried which often remain as residual particle contaminants in high temperature frying fat vessels.

Contaminated frying fat—Contaminated frying fat refers to a frying fat containing food particles and possibly small portions of nonfood contaminants.

Cylindroconical separating zone—"Cylindroconical separating zone" refers to a separating zone having an upper cylindrical portion and a lower conical portion. Such a separating zone is schematically depicted in FIG. 1 and graphically illustrated with respect to a preferred apparatus in FIG. 2.

Vortex—"Vortex" is used herein as that word is conventionally defined in fluid mechanics and refers to a mass of fluid having a whirling or circular motion tending to form a cavity or vacuum in the center of the circle and tending to draw toward this cavity or vacuum, bodies subject to its action.

With continuing reference to FIG. 1 and utilizing the above definitions, a description of the basic process of this invention will now be set forth.

As previously indicated in the summary of the invention, it is preferred that the frying fat used in the process of this invention be at frying temperatures of from 275° F. to 425° F. and most preferably at temperatures from 325° F. to 375° F.; however the process of this invention can be conducted at temperatures as low as 100° F. When low temperatures such as 100° F. are used, the frying fat must be heated prior to frying reuse. The critical criteria for the lowest temperature limitation is the lowest temperature at which the frying fat will be liquid.

More efficient separation of contaminants occurs at frying temperatures and therefore they are preferred. Accordingly most of the description hereinafter given is with reference to the preferred process of using frying temperatures.

In the preferred process, high temperature frying fat, i.e., at temperatures of from 275° F. to 425° F, and most preferably from 325° F. to 375° F., is introduced tangentially through tangential inlet 10 in the upper portion of the upper cylindrical portion 11 of the separating zone. It is important that the contaminated high temperature frying fat be introduced into the upper cylindrical portion 11 in a tangential manner in order that a rotary motion be imparted to the contaminated frying fat. For example, if the contaminated frying fat were introduced into the upper cylindrical portion 11 of the cylindroconical shaped separating zone at a right angle to the upper cylindrical portion diameter 11a, the flow of the contaminated frying fat would not be in a rotary or centrifugal fashion and therefore, as hereinafter described, separation of the contaminating food particles from the high temperature frying fat would not occur. In order to subject the tangentially introduced contaminated frying fat to a sufficient centrifugal force to provide separation of the solid particles of food materials and the reusable frying fat, the contaminated frying fat should be introduced into the upper cylindrical portion 11 of the cylindroconical separating zone at a pressure of from 10 p.s.i. to 100 p.s.i. and preferably from 20 p.s.i. to 80 p.s.i..

After tangential introduction through tangential inlet 10 into the upper cylindrical portion 11 of the cylindroconical shaped separating zone at pressures within the above described pressure ranges, the contaminated frying fat is subjected to a strong centrifugal force within the separating zone. The swirling motion resulting from the tangential introduction and the accompanying centrifugal force from the contaminated frying fat into a vortex within the cylindroconical shaped separating zone. The velocity of the flow of the contaminated frying fat within the vortex hurls to the outer portion of the vortex the more dense solid particles of food material. After being hurled to the outer portion of the vortex, the food particles are subjected to natural gravitational forces and spiral downwardly into the lower conical portion 12 of the cylindroconical separating zone. As solid particles of food material are continually subjected to gravitational force they continue to spiral downwardly along the outer periphery of the vortex which has been created in the separating zone and ultimately they are withdrawn through underflow exit 13.

Turning now to the remaining less dense frying fat, when subjected to the above-described tangential introduction which results in the formation of a vortex, contrary to the more dense solid particles of food material, the less dense frying fat moves to the inner portion of the vortex wherein it is spiraled upwardly along the liquid-free central axis (not depicted in FIG. 1 but depicted as 25 in FIG. 2) which is created by the vortex and is withdrawn from the separating zone through overflow exit 14 and reclaimed for reuse.

As briefly mentioned hereinbefore in the summary of the invention, it is essential that the process of this invention be carried out in the substantial absence of air. This is so because at the high temperature of the frying fat, i.e., 275° F. to 425° F. and preferably 325° F. to 375° F., required for deep fat frying, any substantial exposure of the frying fat to air results in rapid oxidation and a rancid undesirable flavor which can be imparted to the food substance being fried. It is preferred that the volume of dissolved air present in the oil contained in the cylindroconical separating zone be less than 1 percent and most preferably less than 0.50 percent of the volume of the oil contained in the separating zone. The amount of air present in the separating zone can be controlled within the above-described ranges by completely flooding the separating zone with frying fat during the startup procedure. Thereafter, the frying fat is withdrawn from the separating zone and simultaneously the tangential introduction of contaminated high temperature frying fat is commenced. This startup procedure operation should be repeated with each initial run of the process of this invention.

As shown in FIG. 1 and hereinbefore explained, the cylindroconical separating zone has two exits: and underflow exit 13 at the apex of the lower conical portion 12 of the cylindroconical separating zone through which a more dense slurry of frying fat heavily contaminated with solid particles of burnt food is withdrawn, and an overflow exit 14 located centrally in the top of the upper cylindrical portion 11 of the cylindroconical separating zone through which reusable frying fat is substantially free from contaminating solid food particles is withdrawn. The flow rate through the separating zone and out from the underflow exit 13 and out from the overflow exit 14 is controlled by the pressure drop across the separating zone and is determined by measuring the pressure in the system just prior to tangential introduction through tangential inlet 10 and comparing this pressure with the pressure after exiting through overflow exit 14. For most satisfactory operation of the process in regard to processing times, coupled with the most efficient separation of contaminating solid particles of food, the underflow passing through underflow exit 13 should be from 0 percent to 30 percent by weight of the total mass contained in the separating zone and most preferably should be from 0 percent to 15 percent by weight of the total mass including frying fat and solid particles, in the separating zone, and the overflow should be from 70 percent to 100 percent by weight of the total mass and preferably from 85 percent to 100 percent by weight of the total mass in the separating zone. To control the overflow and underflow within the hereinbefore described ranges, the pressure drop across the separating zone measured as hereinbefore described should be from 5 p.s.i. to 50 p.s.i. in regard to the broader ranges and preferably from 10 p.s.i. to 40 p.s.i. and most preferably 10 p.s.i. to 20 p.s.i. in regard to the preferred overflow and underflow percentage ranges. The pressure within the system can be controlled by utilization of conventional centrifugal pumps as shown most clearly in FIG. 3 and by the use of pressure control valves as shown in FIG. 3 and described hereinafter.

Turning now to FIG. 2 which shows a perspective view with parts broken away of a hydraulic cyclone, a preferred apparatus for practicing the process of this invention. A frying fat which the broad temperature range of 100° F. to 425° F. within the preferred and most preferred ranges of from 275° F. to 425° F. and 325° F. to 375° F. contaminated with solid particles of food material is introduced through tangential feed inlet 20 under pressure resulting in the formation of a vortex. Because of the tangential introduction of the contaminated frying fat, as soon as there is sufficient volume of feed to fill the cyclone, and because the feed is composed of elements with different masses, the heavier elements are centrifuged to the outside of the vortex and near the inner wall 21a of hollow truncated cone 21. The lighter particles and less dense frying fat remain near the center of the vortex as indicated by arrows 22, 23 and 24 along liquid free central axis 25. Elements of the contaminated frying fat with intermediate masses will occupy some position intermediate between liquid-free central axis 25 and inner wall 21a of hollow truncated cone 21 where the centrifugal forces generated by the vortex acting upon them are counterbalanced by drag forces. Axial currents and centrifugal forces, as well as gravitational forces generated within the vortex, convey the material in the cyclone to one of two exit apertures, one centrally located at the top of the upper cylindrical part 26 called the overflow aperture 27, and one located at the apex of the hollow truncated cone called the underflow aperture 28. To avoid direct passage from the tangential feed inlet 20 to the overflow aperture 27, the overflow aperture 27 is extended downwards into the vortex created by the dynamic state of the fluid by means of a pipe called the vortex finder 29.

The lighter elements are discharged from the cyclone through the vortex finder 29 and out through overflow aperture 27, and the heavier ones are removed through underflow aperture 28. In regard to contaminating solids, the majority are recovered along with a small amount of frying fat through underflow aperture 28 and a very small portion of finer size particles exit through overflow aperture 27 along with the majority of the frying fat.

In general the critical dimensions of a hydraulic cyclone are its diameters, the sizes of the inlet, overflow, and underflow apertures and the included angle of the lower conical portion. The preferred hydraulic cyclone apparatus dimensions differ for differing materials that are to be separated, for example as the viscosity of the liquid becomes greater and the inch in specific gravity of the medium to be separated less the cyclone diameter should be decreased to provide an increased angular velocity within the vortex. For separation of contaminating food particles and frying fat, certain dimensions have been found most preferable. These specific dimensions will be given with reference to FIG. 1 along with appropriate designations where needed for clarity, to correlate with the numbers on the hydraulic cyclone apparatus of FIG. 2. The upper cylindrical portion diameter 11a of the cylindroconical separating zone should be from 2 inches to 24 inches and preferably from 3 inches to 12 inches. The tangential inlet diameter 10a should be from 0.25 inch to 4.0 inches and preferably from 0.50 inch to 3.0 inches; the overflow exit diameter 14a should be from 0.25 inch to 4.75 inches and preferably from 0.50 inch to 4.0 inches; the overflow exit 14 in FIG. 1 corresponds to the overflow aperture 27 in FIG. 2; the overflow exit length 14b should be from 0.5 inch to 8.0 inches and preferably from 2 inches to 7.25 inches; the overflow exit length 14b of FIG. 1 corresponds to the vortex finder 29 in FIG. 2; the underflow exit diameter 13a of FIG. 1 should be from 0.125 inch to 4.75 inches and preferably from 0.25 inch to 0.50 inch; the underflow exit diameter 13a of FIG. 1 corresponds to the diameter of the underflow aperture 28 in FIG. 2; the included angle 15 of the lower conical portion 12 of the cylindroconical separating zone should be from 2° to 20° and preferably from 5° to 15°. It has been found that utilization of the specific dimensions hereinbefore given provide for the most effective separation within the cylindroconical separating zone of high temperature frying fat from contaminating food particles.

Turning now to FIG. 3 which represents a flow diagram of a preferred continuous system for reclaiming reusable frying fat from a frying fat contaminated with food particles. This preferred system has a plurality of separating zones connected in series and is utilized to provide increased separation efficiency in regards to the quantity of reclaimed reusable frying fat. As used herein, the phrase "connected in series" means that the underflow from each separating zone is utilized as the inlet fluid for the next succeeding zone.

In FIG. 3 there is shown a circulating frying fat zone 30 having a fat drain line 31 and a recirculation line 32. Between fat drain line 31 and recirculation line 32 are three separating zones 33, 34, and 35, connected in series such that the overflow from zone 33 returns to circulating frying fat zone 30 and the underflow from zone 33 is directed into separating zone 34; in separating zone 34 the overflow returns to circulating frying fat zone 30 and the underflow is directed into separating zone 35; in separating zone 35 the overflow is directed into fat drain line 31 and the underflow is discarded.

In actual operation circulating frying fat zone 30 contains a frying fat usually held at high deep fat frying temperatures of from 275° F. to 425° F. and, after a period of use, is contaminated with burnt food particles. Contaminated frying fat drains into drain line 31 and passes through pump 36 where it is pumped through inlet line 37 and tangentially introduced into separating zone 33 wherein the previously described fluid flow causes separation. Pump 36 maintains the frying fat tangential introduction pressure within the hereinbefore described broad range of 10 p.s.i. to 100 p.s.i. and the preferred range of 20 p.s.i. to 80 p.s.i. The overflow from separation zone 33 passes into overflow outlet line 38 and into recirculation line 32 and is returned to frying fat zone 30. The underflow from separating zone 33 is discharged into underflow outlet line 39. The system pressure drop across separating zone 33 is partially controlled by valves 40 and 41 on overflow outlet line 38 and underflow outlet line 39 respectively. From underflow outlet line 39 the underflow from separating zone 33 passes through pump 42 into inlet line 43 and is tangentially introduced into separating zone 34. From separating zone 34 the overflow passes into outlet line 44 and the underflow passes into outlet line 45. Valves 46 and 47 on outlet lines 44 and 45 respectively are utilized to control the pressure drop across separating zone 34.

Preferably, the overflow from separating zone 34 is passed through heat exchanger 48 to insure maintenance at frying temperatures and is then introduced into recirculation line 32 and returned to circulating frying fat zone 30. The underflow from separating zone 34 passes through pump 49 wherein it is pumped into inlet line 50 and tangentially introduced into separating zone 35. The overflow from separating zone 35 passes into overflow outlet line 51 and is reintroduced into fat drain line 31; the underflow from the last separating zone contained in the series of separating zones, in this cases separating zone 35 is discarded through particle discharge line 52. Pressure drop across separating zone 35 is controlled by valves 53 an 54 on lines 51 and 52, respectively.

Utilization of a plurality of separating zones connected in series as shown in FIG. 3 is a highly preferred embodiment of this invention because of the increased quantity of reclaimed and reusable frying fat which results as well as because of the increase in contaminant separation noted. Generally if one separation zone is utilized and the inlet pressure is within the preferred range of 20 p.s.i. to 80 p.s.i. and the pressure drop across the separating zone is within the preferred range of from 10 p.s.i. to 40 p.s.i., the quantity of reclaimed reusable frying fat is from 85 percent to 90 percent by weight of the total mass introduced into the separating zone and the underflow which is discarded is from 10 percent to 15 percent by weight of the total mass introduced into the separating zone. The overflow from the separating zone contains from 5 percent to 30 percent by weight of the contaminating food particles and the underflow contains from 70 percent to 95 percent of the contaminants. While the above ranges relating to quantity of reclaimed reusable frying fat are well within the range acceptable for commercial deep fat frying processes, if a plurality of separating zones, for example three, are connected in series, the percent of reclaimed reusable frying fat is increased by from 10 percent to 15 percent by weight and overall separation efficiency is increased substantially. As used herein, increase in separation efficiency refers to the percent increase in weight of reclaimed reusable frying fat. An increase in the quantity of reclaimed reusable frying fat is exhibited by having from 2 to 7 separating zones connected in series and preferably about 3 seperating zones connected in series. However, when using beyond 3 separating zones and especially when using more than 7, the increase in efficiency is de minimis when compared with the capital cost.

As shown in FIG. 3, a heat exchanger 48 can be placed in the middle of the series to insure that reclaimed frying fat circulated back into frying fat zone 30 is at the desired frying temperature.

As previously explained in the preferred process utilizing a plurality of series-connected separating zones, the inlet into each succeeding separating zone is the underflow from the previous zone which is only a minor portion of the total mass of contaminated fat passing through the previous separation zone. Thus the throughput volume of contaminated frying fat passing through each succeeding separating zone is gradually decreased and likewise the volume of the separating zone itself can be decreased. In actual operation it is preferred that the separating zones gradually decrease in size. Particularly effective separation has been shown to occur when 3 separating zones are employed if the upper cylindrical portion diameter 11a ratio of the zones beginning with the largest which is the first on stream separating zone, depicted as 33 in FIG. 3 and ending with the smallest which is the final separating zone in the series, depicted as 35 in FIG. 3, is 4:2:1.

The following example is offered to illustrate the process of this invention.

EXAMPLE

One thousand pounds of a refined deodorized cottonseed oil is placed in circulating frying fat zone 30, and held at a temperature of 350° F. The high temperature deodorized cottonseed oil at 350° F. is used to continuously fry potato chips for a period of 11 hours, after which it is noted that the bottom portion of circulating frying fat zone 30 contains a heavy sediment of potato chip particles some of which are burnt and dark brown in color. Prior to the commencement of the reclamation process of this invention, each of the separating zones 33, 34, and 35 are flooded with cottonseed oil at 350° F. With continuing reference to FIG. 1, the specific dimensions of separating zones 33, 34, and 35 of FIG. 3 are as follows: First in regard to separating zone 33, the upper cylindrical portion diameter 11a of separating zone 33 is 12 inches; the tangential inlet diameter 10a is 3.0 inches; the overflow exit diameter 14a is 4.0 inches; the overflow exit length 14b is 7.0 inches; the underflow exit diameter 13a is 0.5 inch; the included angle of the lower conical portion 12 of separating zone 33 is 10°.

Next in regard to separating zone 34: The diameter of the upper cylindrical portion is 6 inches; the tangential inlet diameter is 1.5 inches; the overflow exit diameter is 1.5 inches; the overflow exit length is 4 inches; the underflow exit diameter is 0.5 inch; the included angle of the lower conical portion of separating zone 34 is 10°.

Turning now to separating zone 35, the diameter of the upper cylindrical portion is 3.0 inches; the tangential inlet diameter is 0.5 inch; the overflow exit diameter is ⅝ inch; the overflow exit length is 1.25 inches; the underflow exit diameter is 0.5 inch; the included angle of the lower conical portion of separating zone 35 is 5°.

Again with continuing reference to FIG. 3, cottonseed oil held at 350° F. which previously flooded the separating zones, is removed from separating zones 33, 34, and 35 and recirculated into frying fat zone 30. Thereafter a valve, not shown in FIG. 3, is opened whereby contaminated frying fat at 350° drains into drain line 31 and passes through pump 36 wherein it is pumped at a pressure of 30 p.s.i. through inlet line 37, and tangentially introduced into separating zone 33 wherein a vortex providing a centrifugal force within the contaminated fat forms and whereby more dense solids are hurled to the outer portions of said vortex wherein they are subjected to gravitational force and spiralled downwardly to the lower conical-shaped portion of separating zone 33 and are withdrawn through underflow exit line 39, and whereby less dense frying fat substantially free from potato chip particles moves to the inner portion of the vortex and is spiralled upwardly along the liquid-free central axis, 25 in FIG. 2, of the vortex and is withdrawn from separating zone 33 through overflow exit line 38. The pressure drop across separating zone 33 is controlled by valves 41 and 40 on lines 39 and 38, respectively, such that the pressure drop across separating zone 33 is 20 p.s.i.

The overflow from separating zone 33 passes into overflow outlet line 38 and into recirculation line 32 and is returned to frying fat zone 30. The overflow is 90 percent by weight of the oil passing through zone 33. The underflow is 10 percent by weight of the oil passing through zone 33. The underflow from separating zone 33 is discharged into underflow outline line 39. From underflow outlet line 39 the underflow from separating zone 33 passes through centrifugal pump 42 into inlet line 43 and is tangentially introduced into separating zone 34 at a pressure of 45 p.s.i. From separating zone 34 the overflow passes into outlet line 44 and the underflow passes into outlet line 45. The overflow is 90 percent by weight of the oil passing through said zone and the underflow is 10 percent by weight of said oil. Valves 46 and 47 on outlet lines 44 and 45, respectively, are utilized to control the pressure drop across separating zone 34 at a level of 20 p.s.i.

The overflow from separating zone 34 is passed through heat exchanger 48 and the temperature is adjusted to 350° F. thereafter the overflow is introduced into recirculation line 32 and returned to circulating frying fat zone 30. The underflow from separating zone 34 passes through pump 49 wherein it is pumped into inlet line 50 at a pressure of 20 p.s.i., and tangentially introduced into separating zone 35. The overflow from separating zone 35 which is 90 percent of the oil passing through said zone passes into overflow outlet line 51, and is reintroduced into fat drain line 31 wherein it is reintroduced into separating zone 33. The underflow from the last separating zone, 35, which is 10 percent of the oil passing therethrough, is discharged through particle discharge line 52. Pressure drop across separating zone 35 is controlled at a level of 15 p.s.i. by valves 53 and 54 on lines 51 and 52, respectively.

The percent by weight of oil reclaimed and reusable from three zones connected in series is in excess of 99 percent. The amount of contaminants returned to frying zone 30 is estimated to be about 5 percent of the total weight of contaminants.

The upper cylindrical portion diameter ratio of separating 33, 34, and 35 is 4:2:1. The total flow rate through separating zones 33, 34, and 35 is 360 gallons/minute.

When in example 1 separating zones 34 and 35 are disconnected and separating zone 33 is employed alone, substantially similar results are obtained in that satisfactory separation of potato chip particles from high temperature frying fat occurs.

The percentage of oil reclaimed and reusable from a single zone, 33, is 90 percent.

Because of the startup method employed, the continuous process as defined in this Example is conducted in a substantial absence of air; more specifically, the volume of dissolved air present in the oil contained separating zones is determined and found to be less than 1.0 percent of the volume of the oil.

When in example 1 the contaminated frying fat is cooled to 145° F. prior to the reclamation process and reheated to the frying temperature of 350° F. prior to recirculation into frying fat zone 30, substantially similar results are obtained in that a satisfactory, but slightly less efficient separation of potato chip particles from frying fat occurs.

What is claimed is:

1. A continuous process for reclaiming reusable frying fat from frying fat contaminated with solid particles of food material, said process comprising; tangentially introducing, through a tangential inlet, a flow of food particle-containing frying fat at a pressure of 10 p.s.i. to 100 p.s.i. and at a temperature of from 100° F. to 425° F. into the upper cylindrical portion of a cylindroconical shaped separating zone so that said particle-containing frying fat forms a vortex providing a centrifugal force within said particle-containing fat whereby more dense solid particles of food materials are hurled to the outer portion of said vortex wherein they are subjected to gravitational force and spiral downwardly to the lower conical shaped portion of said zone and are withdrawn through an underflow exit and whereby less dense frying fat substantially free from food particles moves to the inner portion of the vortex and is spiraled upwardly along the liquid free central axis of the vortex and is withdrawn from said zone through an overflow exit and reclaimed for reuse, said process being conducted in the substantial absence of air.

2. The process of claim 1 wherein the frying fat temperature is at frying temperatures of from 275° F. to 425° F.

3. The process of claim 2 wherein the frying fat temperature is from 325° F. to 375° F.

4. The process of claim 1 wherein the frying fat is tangentially introduced into said separating zone at a pressure of from 20 p.s.i. to 80 p.s.i.

5. The process of claim 1 wherein the volume of dissolved air present in the oil contained in said separating zone is less than 1 percent of the volume of said oil contained in said zone.

6. The process of claim 5 wherein the volume of dissolved air is less than 0.5 percent.

7. The process of claim 1 wherein the pressure drop across said separating zone is from 5 p.s.i. to 50 p.s.i.

8. The process of claim 7 wherein the pressure drop across said separating zone is from 10 p.s.i. to 40 p.s.i.

9. The process of claim 8 wherein the pressure drop across said separating zone is from 10 p.s.i. to 20 p.s.i.

10. The process of claim 1 wherein the upper cylindrical portion of said separating zone has a diameter of from 2 inches to 24 inches, the tangential inlet of said separating zone has a diameter of from 0.25 inch to 4.0 inches, the overflow exit of said separating zone has a diameter of from 0.25 inch to 4.75 inches and an overflow exit length of from 0.5 inch to 8.0 inches, the underflow exit of said separating zone has a diameter of from 0.125 inch to 4.75 inches and the included angle of said separating zone is from 2° to 20°.

11. The process of claim 10 wherein the upper cylindrical portion of said separating zone has a diameter of from 3 inches to 12 inches, the tangential inlet of said separating zone has a diameter of from 0.5 to 3.0 inches, the overflow exit of said separating zone has a diameter of from 0.5 inch to 4.0 inch and an overflow exit length of from 2 inches to 7.25 inches, the underflow exit of said separating zone has a diameter of from 0.25 inch to 0.50 inch and the included angle of said separating zone is from 5° to 15°.

12. The process of claim 1 wherein a plurality of separating zones connected in series are utilized.

13. The process of claim 12 wherein the number of separating zones is from 2 to 7.

14. The process of claim 13 wherein the number of separating zones is 3.

15. The process of claim 14 wherein the ratio of the upper cylindrical portion diameter of the three separating zones, beginning with the largest which is the first on stream separating zone and ending with the smallest is 4:2:1.